United States Patent
Raith et al.

(10) Patent No.: US 6,374,098 B1
(45) Date of Patent: Apr. 16, 2002

(54) SYSTEMS AND METHODS FOR LOCATING REMOTE UNITS OPERATING IN A RADIOCOMMUNICATION SYSTEM USING AN ADJUNCT SYSTEM

(75) Inventors: Alex K. Raith, Durham; R. David Koilpillai, Apex; Gregory E. Bottomley, Cary; Havish Koorapaty, Raleigh; Rajaram Ramesh, Cary, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/840,590

(22) Filed: Apr. 22, 1997

(51) Int. Cl.[7] .............................................. H04M 11/00
(52) U.S. Cl. ...................... 455/404; 455/456; 455/11.1; 455/9; 455/521; 342/457
(58) Field of Search .................................. 455/404, 456, 455/403, 422, 521, 500, 11.1, 424, 457, 9, 517, 503, 524, 525, 550; 342/387, 457

(56) References Cited

U.S. PATENT DOCUMENTS

| 4,152,647 A | * | 5/1979 | Gladden et al. ............ 455/11.1 |
| 4,825,457 A | * | 4/1989 | Lebowitz ..................... 455/404 |
| 5,016,269 A | * | 5/1991 | Rogers ........................ 455/404 |
| 5,175,867 A |   | 12/1992 | Wejke et al. ............... 455/33.1 |
| 5,327,144 A | * | 7/1994 | Stilp et al. ................... 455/404 |
| 5,343,493 A | * | 8/1994 | Karimullah .................. 455/404 |
| 5,353,332 A |   | 10/1994 | Raith et al ..................... 379/59 |
| 5,408,679 A | * | 4/1995 | Masuda ....................... 455/11.1 |
| 5,499,386 A |   | 3/1996 | Karlsson ..................... 455/33.2 |
| 5,706,333 A | * | 1/1998 | Grenning et al. ............ 455/424 |
| 5,790,939 A | * | 8/1998 | Malcolm et al. ............. 455/424 |
| 5,873,040 A | * | 2/1999 | Dunn et al. .................. 455/456 |

FOREIGN PATENT DOCUMENTS

WO          WO97/14257          4/1997

OTHER PUBLICATIONS

International Search Report re PCT/US 98/06498 Date of mailing of search: Jan. 29, 1999.
Louis A. Stilp, "Time Difference of Arrival Technology for Locating Narrowband Cellular Signals", Proceedings of the SPIE, vol. 2602, pp. 134–144 (1996).

* cited by examiner

*Primary Examiner*—William Trost
*Assistant Examiner*—Keith Ferguson
(74) *Attorney, Agent, or Firm*—Burns, Doane, Swecker & Mathis, L.L.P.

(57) ABSTRACT

Emergency call handling may, in the near future, require terminal unit location information to be provided to emergency service centers. Independent or quasi-independent systems, sometimes referred to as adjunct systems, can be provided to monitor remote unit transmissions and derive location information for mobile units making emergency access therefrom. Techniques for determining which channels each adjunct receive shall monitor are described herein, as well as specific monitoring techniques. Moreover, the adjunct system can use the received information to provide a second speech path to an emergency service center.

24 Claims, 8 Drawing Sheets

SYSTEMS AND METHODS FOR LOCATING REMOTE UNITS OPERATING IN A RADIOCOMMUNICATION SYSTEM USING AN ADJUNCT SYSTEM

BACKGROUND

Applicants' invention relates generally to radiocommunication systems, e.g., cellular or satellite systems and, more particularly, to techniques for supporting and enhancing emergency calling procedures in such systems.

The growth of commercial radiocommunications and, in particular, the explosive growth of cellular radiotelephone systems have changed the ways in which people communicate. One survey indicates that about 80% of the people who purchase mobile communication units and service subscriptions do so to enhance their personal security. Presumably, many of these subscribers would expect to use their mobile units to aid them in urgent situations, e.g., when their vehicle has become disabled or in an emergency situation requiring rapid medical and/or police response. In these circumstances it would be desirable that the radiocommunication system be able to independently determine a location of the mobile unit, particularly in the case where the subscriber does not know his or her precise location. Moreover, it is expected that the FCC will soon require that network operators forward the position of an emergency caller to the emergency service provider.

There are many techniques available to generate mobile unit location information. In a first category, the mobile unit could estimate its own position and send a message with its coordinates when placing an emergency call. This could be accomplished by, for example, providing the mobile unit with a Global Positioning System (GPS) receiver that receives location information from the GPS satellite network. The mobile unit can then transmit this information to the system, which would then forward it to the emergency service provider. This requires, however, significant modification of existing mobile units to include GPS receivers, as well as additional signalling between the mobile units and base stations.

Alternatively, the base stations which transmit signals to, and receive signals from, the mobile units could be used to determine the mobile unit's location. Various techniques, including attenuation of a mobile unit's signal, angle-of-arrival, and difference between the time-of-arrival (TDOA) of a mobile unit's signal at different base stations, have been suggested for usage in providing mobile unit location information. See, for example, the article entitled "Time Difference of Arrival Technology for Locating Narrowband Cellular Signals" by Louis A. Stilp, SPIE Vol. 2602, pp. 134–144. These solutions also have their drawbacks including the need to modify the many existing base stations, e.g., to provide array antennas to support angle-of-arrival techniques or to synchronize base station transmissions to support TDOA techniques.

A third category of strategies for locating mobile units in radiocommunication systems involves the provision of an adjunct system, i.e., a system which may be completely independent of the radiocommunication system or which may share various components (e.g., an antenna) with the radiocommunication system but which processes signals separately therefrom. This may be advantageous, for example, as an expedient solution to providing mobile unit location without modifying the large number of existing base stations in a system. For example, consider the equipment illustrated in FIG. 1 wherein the adjunct scanning units are not co-located with the base stations of radiocommunication system. Therein, a base station 1 supports radiocommunication within cell 2 and, in particular with mobile unit 3. An adjunct system, partially shown by way of scanning units 4, 5 and 6, monitors accesses to the system by mobile unit 3. When mobile unit 3 makes an emergency access, adjunct units 4, 5 and 6 can detect this emergency access by, for example, the presence of a set emergency flag in an origination message or based upon the dialed number. The adjunct units can then use the mobile unit's transmissions on either a control channel or a traffic channel to provide information to a location processing center 7. The location processing center then uses the information provided by the various adjunct units to, for example, triangulate the position of mobile unit 3 and report this position to an emergency service center 8. More details regarding exemplary usages of adjunct systems can be found in U.S. Pat. No. 5,327,144 to Stilp et al., entitled "Cellular Telephone Location System", the disclosure of which is incorporated here by reference.

From a system perspective, the operation of the adjunct system becomes more complicated in terms of assigning monitoring duties to specific adjunct receivers. Consider the exemplary system of FIG. 2. Therein, for each cell C1 to C10, there is a respective base station B1 to B10 which is connected to a PSTN (not shown) via a mobile switching center. FIG. 2 also illustrates ten mobile stations M1 to M10, which are movable within a cell and from one cell to another cell. Of course most systems would have more mobile stations than ten. Lastly, a plurality of adjunct receivers may be provided to locate mobile units M1–M10, only seven of which (A1 to A7) are illustrated to simplify the figure.

Each cellular system is assigned a particular frequency band over which it can operate. A set of communication channels is allocated to each cell. For example, between 10 and 30 different voice channels and 1 control channel may be allocated to any given cell. Different sets of communication channels are allocated to neighboring cells since, in order to maintain full radio coverage, cells overlap each other. Using the same channels in adjacent cells would cause cochannel interference in these overlapping areas.

The question arises as to which channels each adjunct station, e.g., A1–A7, should monitor and how each adjunct station should make this determination. As seen in FIG. 2, it may be desirable to have adjunct stations A1 and A2 monitor the transmissions from mobile station M7 due to their proximity thereto even though these adjunct stations are outside of cell C1. Accordingly, it would be desirable to provide techniques for assigning monitoring duties (i.e., determining which control and/or traffic channels each adjunct receiver should monitor) to individual adjunct receivers.

SUMMARY

According to one exemplary embodiment of the present invention, an adjunct receiver monitors downlink channels according to a frequency plan associated with the radiocommunication system that it is to monitor. For each channel on which the adjunct receiver receives signals, the adjunct receiver evaluates the received information to determine if it is associated with a control channel or a traffic channel.

The identified control channels are forwarded to a hub or central processing center. The hub receives similar information from a plurality of adjunct receivers and then responds by assigning each adjunct receiver to monitor certain control channels. According to other exemplary embodiments, the adjunct receiver begins this process by monitoring uplink channels.

Once assigned, adjunct receivers begin monitoring their assigned control channels to look for emergency calls made by mobile units. The adjunct units may first synchronize to the downlink control channel to narrow the timing window for receiving uplink bursts. The monitoring of uplink bursts may include, for example, evaluating bursts on a subchannel-by-subchannel basis to identify accesses by different users.

Some adjunct units may miss access bursts due to, for example, changing RF interference conditions. According to exemplary embodiments of the present invention, other adjunct units may broadcast received mobile unit transmission information over a common communication bus so that adjunct units which miss certain information, e.g., traffic channel assignments, still have an opportunity to provide location information to an emergency service center.

Other exemplary embodiments of the present invention describe additional uses of the adjunct system. For example, the adjunct system can also process the signals received by the adjunct receivers to provide a second speech path to the emergency service center. Since the adjunct system receives multiple copies of each emergency access, diversity techniques can be used to improve the second speech path.

BRIEF DESCRIPTION OF THE DRAWINGS

The features and advantages of Applicants' invention will be understood by reading this description in conjunction with the drawings, in which.

DETAILED DESCRIPTION

Figure 1:
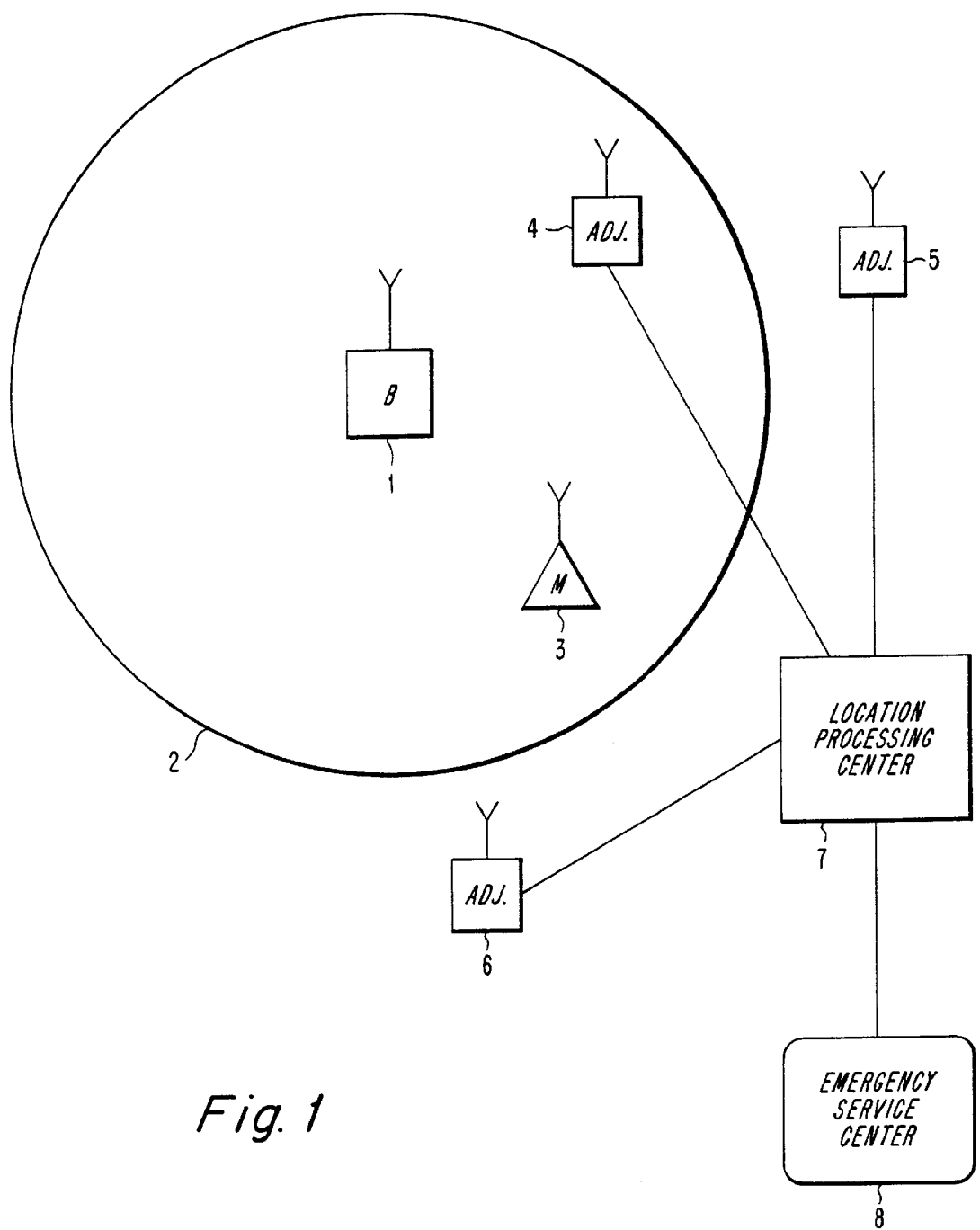
FIG. 1 is a diagram of an exemplary cellular radio telephone system having an adjunct monitoring system for providing mobile unit location information to an emergency service center in which the present invention may be applied.
Figure 2:
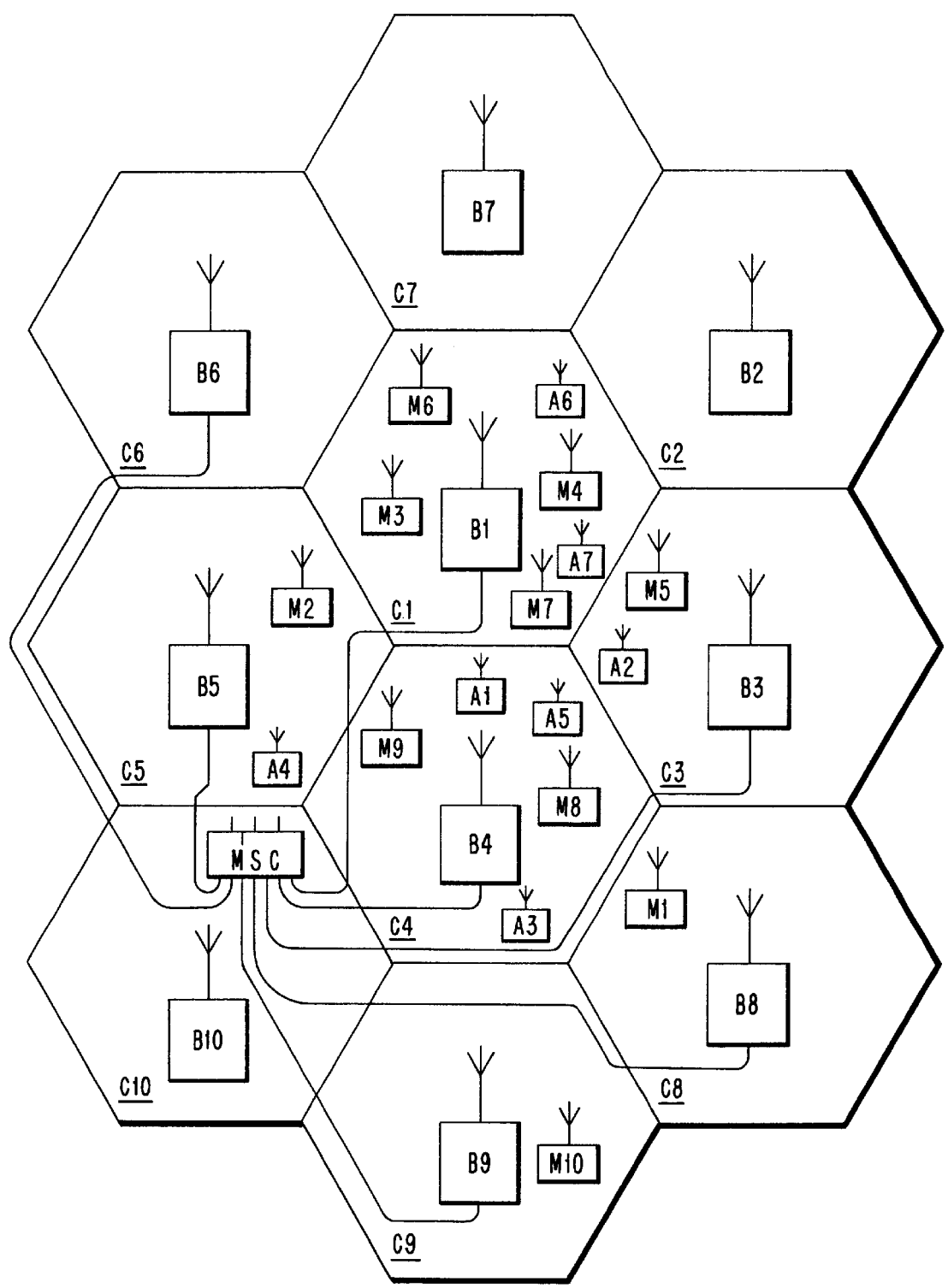
FIG. 2 illustrates an expanded version of the system of FIG. 1.

The following description is scripted in terms of a cellular radiotelephone system, but it will be understood that Applicants' invention is not limited to that environment and may be used in other types of wireless systems, e.g., systems which provide radiocommunication service using satellites, voice-trunked systems such as Land Mobile Radio (LMR) or Special Mobile Radio (SMR) systems, etc. Also, while the exemplary embodiments described below are provided in the context of Time Division Multiple Access (TDMA) communication systems, it will be understood by those skilled in the art that the present invention may be applied to systems using any access methodology, e.g,. Frequency Division Multiple Access (FDMA), Code Division Multiple Access (CDMA) and hybrids of FDMA, TDMA and/or CDMA.

Consider, solely for the purposes of example, the prevalent digital cellular radiotelephone system in North America known as the digital advanced mobile phone service (D-AMPS), some of the characteristics of which are specified in the interim standard IS-54B, "Dual-Mode Mobile Station-Base Station Compatibility Standard", published by the Electronic Industries Association and Telecommunications Industry Association (EIA/TIA). Because of a large existing consumer base of equipment operating only in the analog domain with frequency-division multiple access (FDMA), IS-54B is a dual-mode (analog and digital) standard, providing for analog compatibility in tandem with digital communication capability. For example, the IS-54B standard provides for both FDMA analog voice channels (AVCs) and TDMA digital traffic channels (DTCs), and the system operator can dynamically replace one type with the other to accommodate fluctuating traffic patterns among analog and digital users. The AVCs and DTCs are implemented by frequency modulating radio carrier signals, which have frequencies near 800 megahertz (MHz) such that each radio channel has a spectral width of 30 kilohertz (KHz).

The IS-54-B standard also provides for a number of analog control channels (ACC) on which system accesses can be initiated and system overhead information can be communicated to the mobile units. A subsequent standard, referred to as IS-136, adds specifications for digital control channels (DCCs), which standard is incorporated here by reference. Whereas the analog control channels of IS-54-B were located on fixed, predetermined frequencies, the DCCs of IS-136 can be provided on any frequency among those allocated to a particular cell.

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. According to IS-54B and IS-136, each TDMA frame consists of six consecutive time slots and has a duration of 40 milliseconds (msec). Thus, each frame can carry from one to six channels (e.g., one to six radio connections), which may be a mixture of DTCs and DCCs used to convey information between a base station and a mobile station.

Figure 3:
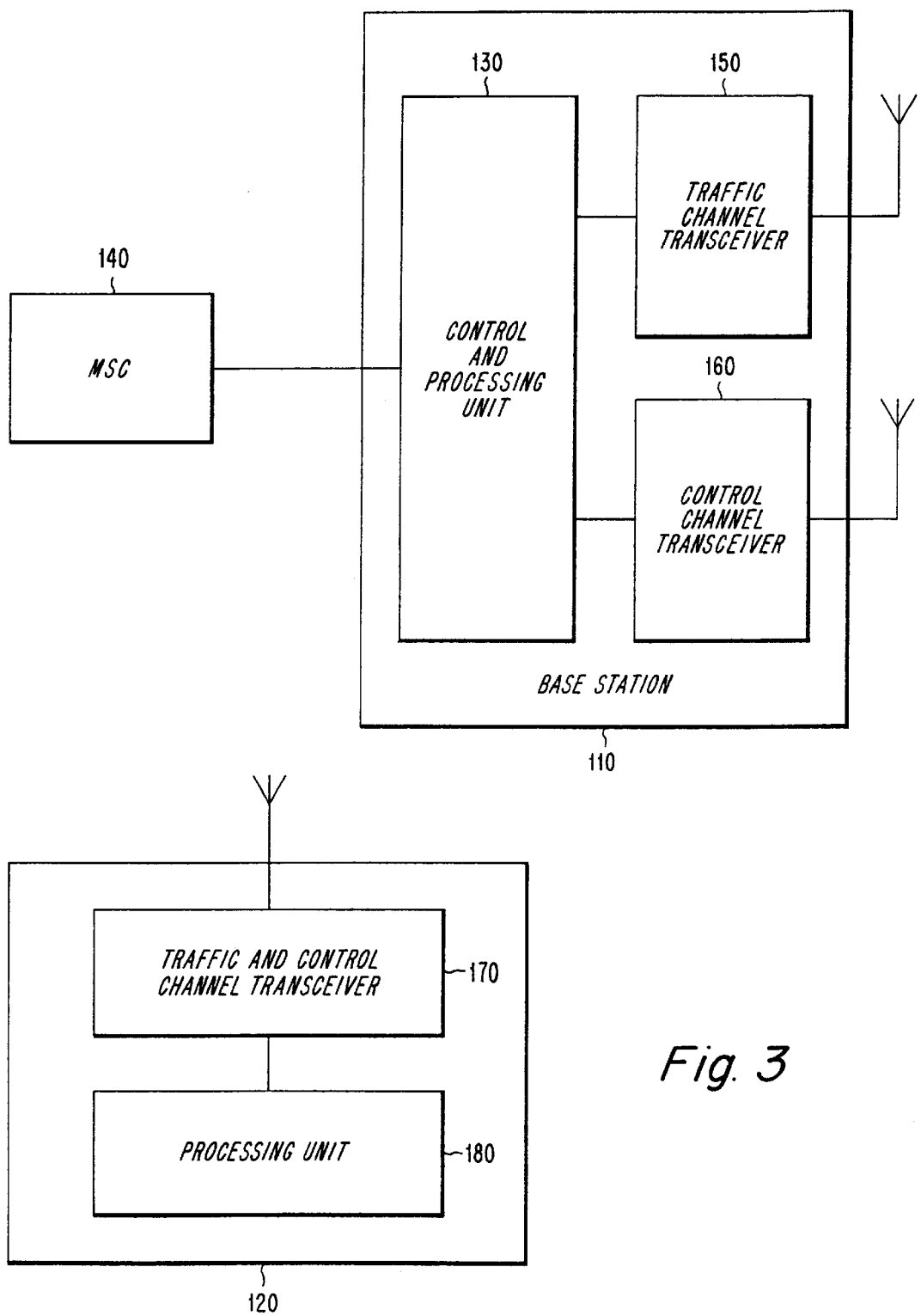
FIG. 3 illustrates an exemplary mobile and base station which can be used to implement the present invention.

FIG. 3 represents a block diagram of an exemplary cellular mobile radiotelephone system, including an exemplary base station 110 and mobile unit 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System," and U.S. Pat. No. 5,745,523 entitled "Multi-Mode Signal Processing," both of which are incorporated in this application by reference.

The base station 110 handles a plurality of traffic channels through a traffic channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the traffic and control transceiver 170 in the mobile station, for use with control channels and traffic channels that share the same radio carrier frequency.

After an idle mobile unit 120 has located a control channel, e.g., by using digital control channel location information found on a traffic channel, it can then read the control information transmitted on that control channel, e.g., paging messages, using its traffic and control channel transceiver 170. For more detailed information relating to techniques for locating digital control channels, the reader is referred to U.S. patent application Ser. No. 08/331,711 entitled "Method and Apparatus for Locating a Digital Control Channel in a Radiocommunication System", filed on Oct. 31, 1994, the disclosure of which is incorporated here by reference. When a connection between the mobile station 120 and the system is desired, the transceiver 170 will tune to a traffic channel assigned thereto by the system.

Once the mobile unit has found a control channel which satisfies a minimum set of rules, e.g., the mobiles must be able to receive the channel above a minimum received signal strength, the mobile may further evaluate this control channel with regard to certain system preferences stored in the mobile unit. For example, if the cell is barred (as described in IS-136), or the cellular operator is not the preferred operator (using the System Operator Code in IS-136), the mobile unit may then try to find another control channel.

If the data broadcast by the cellular system on the control channel (this part of the DCC is often referred as to the Broadcast Control Channel or BCCH) satisfies the preferences stored in the mobile unit, the mobile unit will listen or lock to this control channel to listen for paging messages and/or transmit call origination messages. At the same time, however, the mobile unit prepares for potential cell reselection since the mobile may be traveling and leaving the coverage area of the first selected control channel. Many known techniques exist for informing a mobile unit where (e.g., using one or more of frequency, time, and code) the neighboring control channels can be found in order for mobile units to test and compare these candidates with the current control channel to find the best control channel to serve the mobile unit given its current position. See, for example, U.S. Pat. No. 5,353,332 to Raith and Muller, entitled "Method and Apparatus for Communication Control in a Radiotelephone System" or U.S. Pat. No. 5,499,386, entitled "Best Server Selection in Layered Cellular Radio System" to Karlsson, the disclosures of which are incorporated here by reference.

The adjunct receivers, e.g., units 4–6 in FIG. 1, can have receiving and processing capabilities similar to those provided in the base stations described above and may, for example, operate to process received signals as described in the above-incorporated Stilp patent. However, as a preliminary matter, each adjunct receiver must determine, or be instructed, as to which channels it should be monitoring for emergency accesses.

Figure 4:
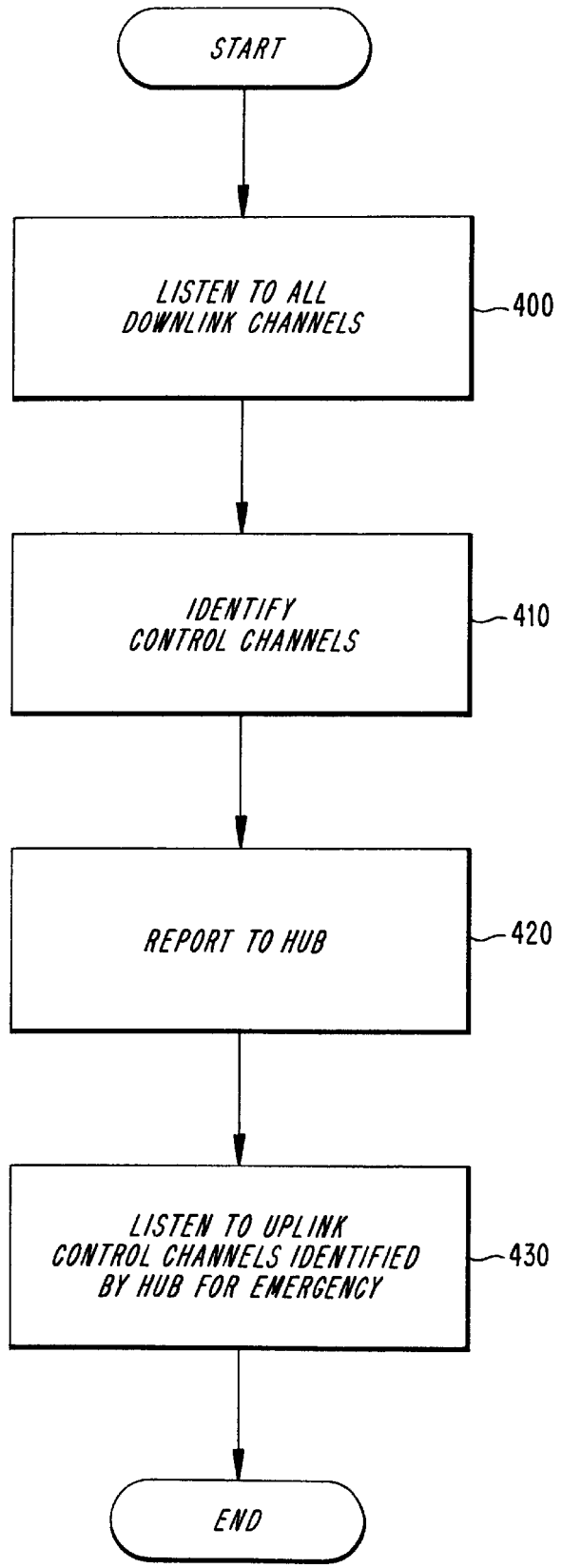
FIG. 4 is a flow chart illustrating a first exemplary embodiment of the present invention.

According to a first exemplary embodiment, which will be described with reference to the flow chart of FIG. 4, each adjunct receiver can be programmed to listen on all of the downlink channel frequencies associated with a particular system at step 400. Of course, the adjunct receiver may not be able to "hear" transmissions on all frequencies due to frequency reuse. However, for those channels on which the adjunct receiver does receive a base station transmission, the adjunct receiver can then determine whether the channel is a control channel or a traffic channel at step 410. This can be accomplished by evaluating the received signal based upon differences between control channel transmissions and traffic channel transmissions, e.g., differences in the convolutional encoding rate, as described in more detail in the above-incorporated U.S. patent application Ser. No. 08/331, 711, entitled "Method and Apparatus for Locating a Digital Control Channel in a Radiocommunication System".

The control channels which the adjunct receiver has identified may then be reported to a central hub, e.g., location processing center 7 in FIG. 1, as illustrated in block 420. The hub, which receives reports from all of the adjunct receivers in a particular area, can determine which of the control channels that each individual adjunct station should monitor given the overall adjunct system coverage and traffic patterns. For example, it may be the case that a certain control channel can be monitored by 10 adjunct receivers, but that the location processing center only needs to receive signals from three adjunct receivers to provide the specified location information. Thus, the hub would inform only three of the adjunct receivers to monitor that particular control channel, the selection of which may designed to even out the monitoring load throughout the adjunct system. Then, at block 430, this particular adjunct station will listen to those uplink control channels (known due to the duplex frequencies pair defined for each channel) identified by the hub, which may be a subset of those to which the adjunct is capable of listening, to determine when a mobile unit is making an emergency access. When an emergency access is recognized, either based, for example, upon an explicit indicator found in the uplink control channel or based upon the number dialed by the mobile unit, the adjunct receiver then forwards the received signals to center 7 for further processing as, for example, described in U.S. patent application Ser. No. 08/840,590, entitled "Systems and Methods for Locating Remote Terminals in Radiocommunication Systems", filed on Apr. 22, 1997, the disclosure of which is incorporated here by reference.

Figure 5A:
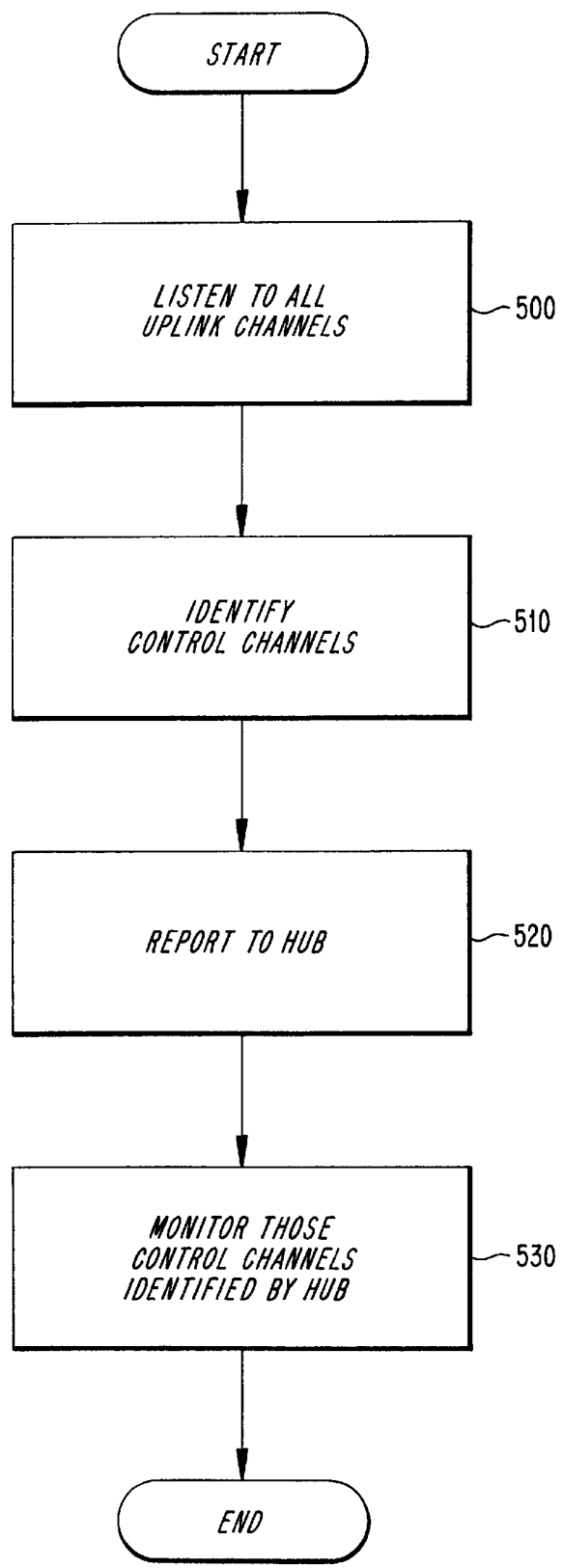
FIG. 5(a) is a flow chart illustrating a second exemplary embodiment of the present invention.
Figure 5B:
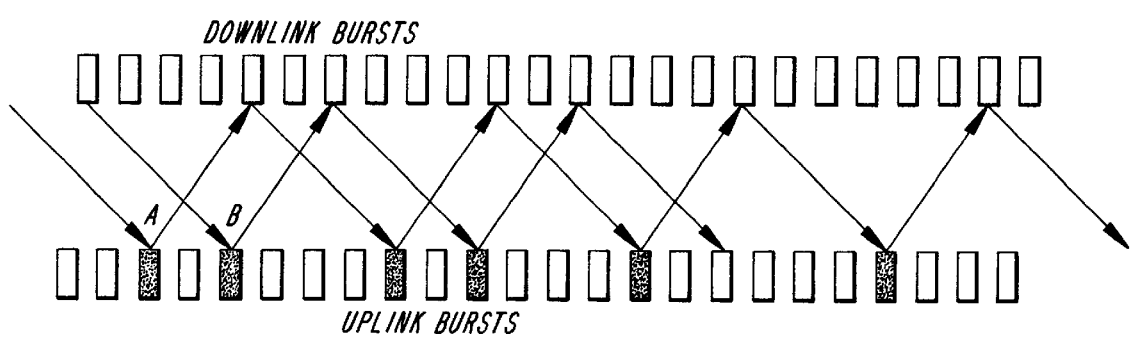
FIG. 5(b) is a flow chart illustrating uplink subchanneling.

According to another exemplary embodiment of the present invention, instead of initially listening to downlink channels, each adjunct receiver first listens to all of the uplink channels, i.e., transmissions from the mobiles to the base stations, for a particular system. This embodiment is illustrated in FIG. 5(*a*). Therein, the adjunct first listens to all uplink channels (block 500) and identifies which of these channels are control channels (block 510). The identified control channels are forwarded to the hub (block 520) where a subset is selected for monitoring by that particular adjunct station. The adjunct station then monitors those control channels identified by the hub (block 530) to identify and report emergency accesses made by mobile units.

An adjunct system that listens for remote unit access on the uplink control channel may reduce its search window for access bursts by first time synchronizing to the downlink control channel. Most access control channels have a TDMA structure in which access time slots are provided. According to this exemplary embodiment, the adjunct system first listens to the downlink control channel so that it will know (applying known rules of the appropriate technology, e.g., IS-136) when the start of an access burst may come. Of course, certain timing uncertainties remain, e.g., due to the distances between the base station, mobiles stations and the adjunct system and time dispersion. However, by first synchronizing to the downlink control channel the uncertainty in arrival time is vastly reduced.

In systems specified by IS-136, the uplink control channel is referred to as the Random Access CHannel (RACH). In IS-136, there are six access paths defined as subchannels in the RACH to reduce the complexity of the base station and mobile station. For example, two of these access paths are denoted by letters 'A' and 'B' in FIG. 5(b). The adjunct system collects the access bursts from the different access paths such that one user's burst are grouped together in the same manner as the performed by IS-136 compliant base stations. That is, the adjunct system will first group the bursts by subchannel and by mobile station identification. Then, the adjunct system can analyze the content of the access burst to determine if it relates to an emergency access.

The access burst from a mobile may not always be received by the base station and, therefore, the IS-136 standard describes a protocol defining how the mobile shall re-transmit an unacknowledged burst. For example, there are different rules governing how to re-transmit a first access burst as compared with subsequent bursts. An adjunct system, which may not be co-located with the base station, may correctly receive bursts transmitted by a mobile station which are not received correctly by the base station. Thus, the adjunct system should be able to discard duplicate access bursts which it receives due to retransmission. For example, the adjunct system can monitor the downlink channel to see whether the cellular base station acknowledged a particular burst or not and hence determine whether the next transmitted burst is repetitive or is a subsequent burst in the access event. In systems defined according to IS-136, the radiocommunication system transmits a first burst/repeat burst indicator in each transmitted burst that can be used to resolve repetition.

Depending on the protocol used, the mobile unit may select a new access path in a single access event. The adjunct system needs to have knowledge of the particular access protocols for the system (or systems) which it is to monitor because, for example, only the first transmitted burst contains the identity of the mobile.

As mentioned above, when a mobile unit makes an access attempt to establish a connection with a radiocommunication system, it does so by sending messages on an uplink access channel or control channel. When adjunct receivers scan channels, e.g., control or traffic channels, it is possible that a particular transmission is received by only some of the adjunct receivers which are responsible for monitoring those channels, e.g., as assigned by the hub.

Figure 6:
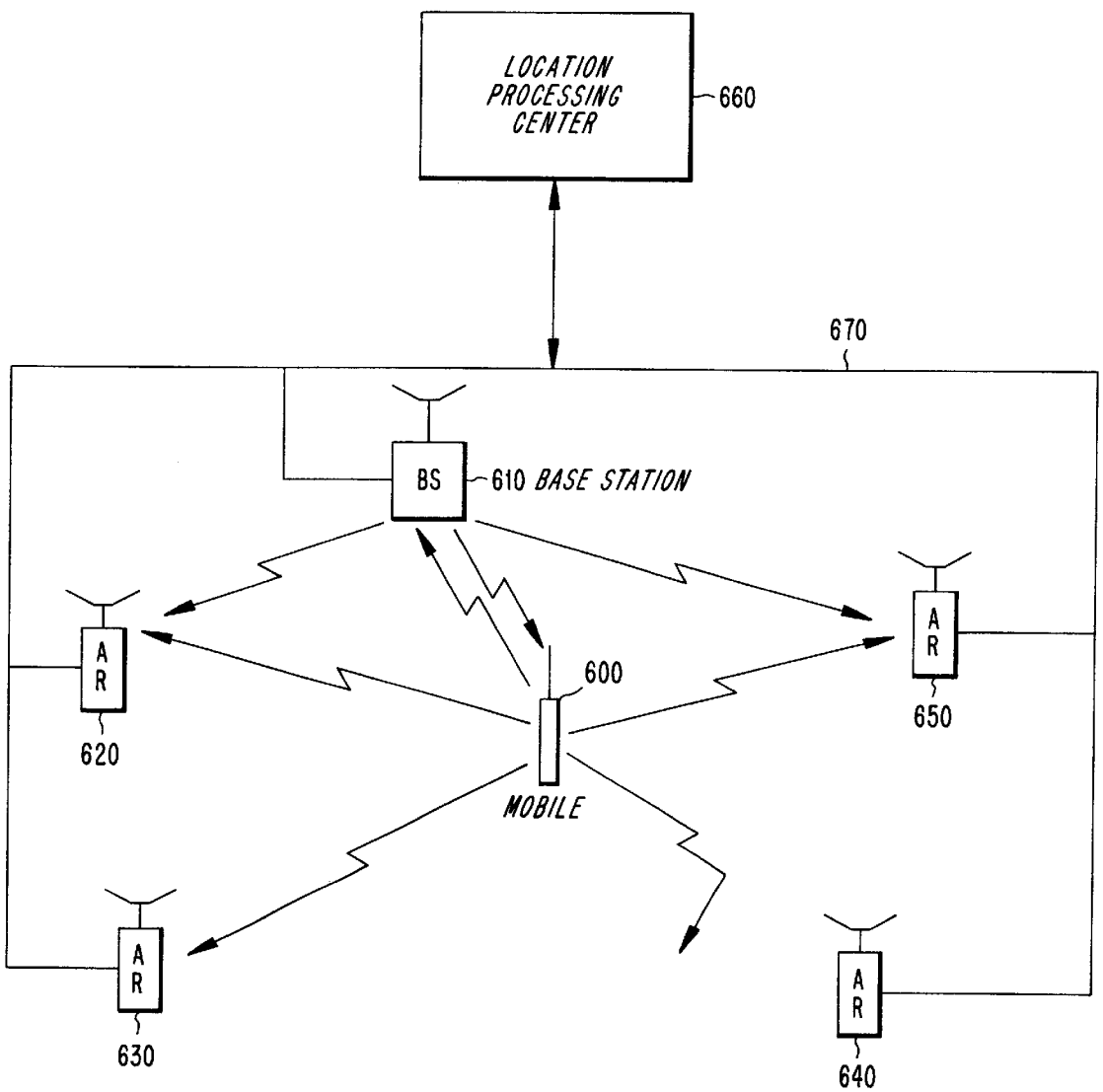
FIG. 6 illustrates mobile unit transmission monitoring according to an exemplary embodiment of the present invention.

Consider, for example, the scenario illustrated in FIG. 6. Therein, a mobile unit 600 is communicating an emergency access to base station 610 via an uplink control channel. Adjunct receivers 620, 630, 640 and 650 are monitoring this control channel to identify emergency accesses and send information, e.g., location information to a location processing center 660 via a communication infrastructure 670. However, in this example, adjunct receiver 640 does not receive the uplink transmission from mobile unit 600. This could happen, for example, due to adverse channel conditions that are temporary.

In this situation, since adjunct receiver 650 missed the emergency call request by the mobile on the uplink, it will not make range measurements on the mobile's transmissions at a later time since it is unaware of the mobile's emergency call request. Similarly, on the downlink, it is likely that the some of the nearest adjunct receivers to the mobile, e.g., adjunct receivers 630 and 640, may not be able to receive the base station's signals since they are relatively far away from the base station. In such a situation, these adjunct receivers will not be able to receive the mobile's signals once the mobile moves to a traffic channel that has been assigned by the base station on a downlink transmission. Therefore, these receivers will not be able to use the traffic channel transmission of the mobile unit to either obtain or refine its range estimate to that mobile unit.

However, it is likely that at least one of the other adjunct receivers, e.g., adjunct receiver 620 or 650, was able to identify the transmission by the mobile or the base station. This receiver can broadcast this information to the other adjunct receivers over communication infrastructure 670. The broadcast information could include the information contained in the transmission detected. For example, if a traffic channel assignment was detected, the adjunct receiver that was able to receive this information can broadcast the frequency and time slot number of the traffic channel assigned to the other receivers. This would enable a receiver that missed the traffic channel assignment to scan the assigned traffic channel for future transmissions by the mobile and use them to estimate range.

Figure 7:
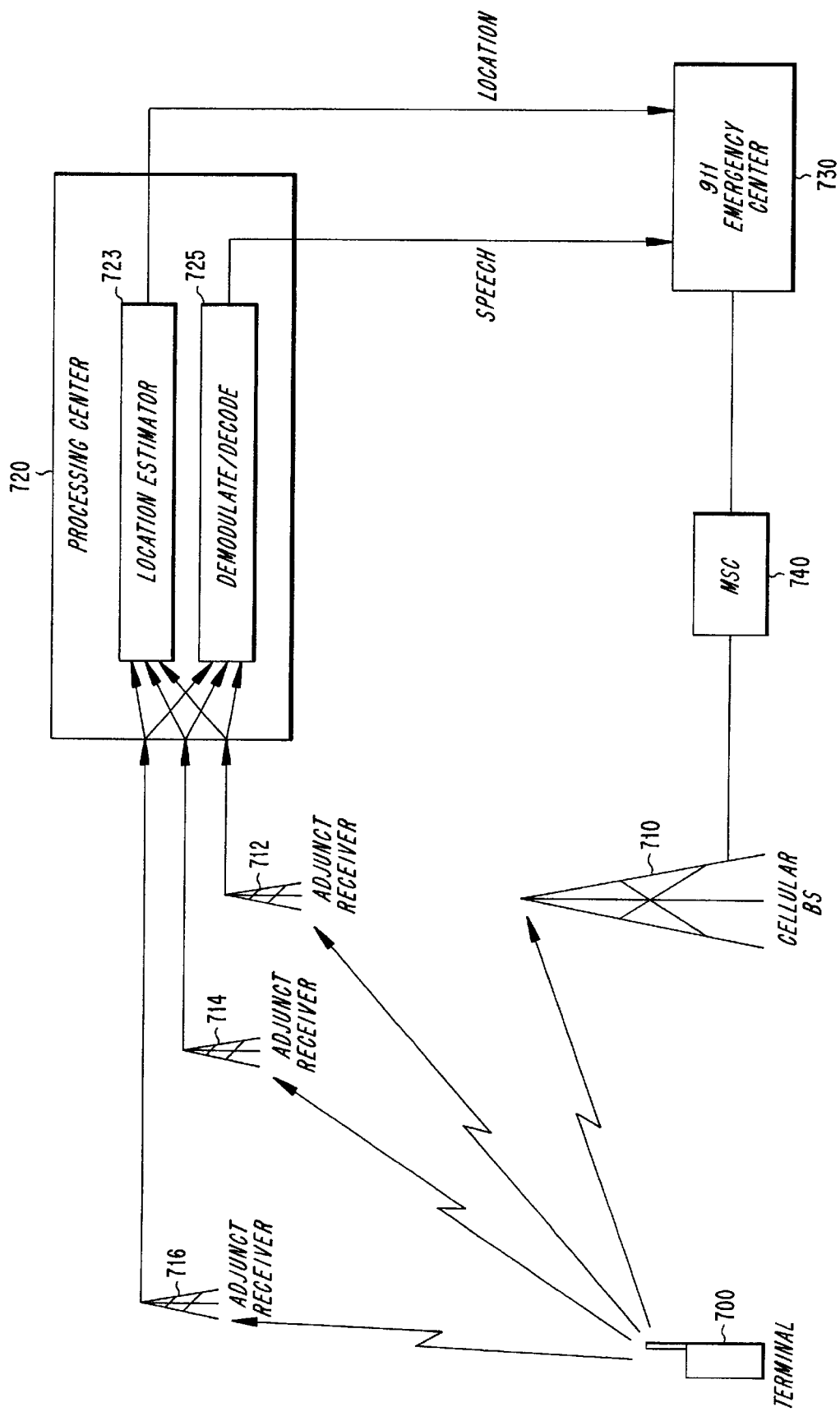
FIG. 7 depicts the provision of a second speech path by an adjunct system according to an exemplary embodiment of the present invention.

As mentioned above, one function of the adjunct system is to provide location information associated with remote stations, e.g., remote units making emergency accesses to the radiocommunication system. However, since the adjunct system is available for receiving information transmitted by the remote units, this information can be used for other purposes. For example, the adjunct system can also provide speech information associated with the emergency call to the emergency service center as illustrated in FIG. 7. Therein, a terminal or mobile unit 700 is transmitting an emergency call on a traffic channel assigned thereto by the radiocommunication system including base station 710. The adjunct system, including adjunct receivers 712, 714 and 716 are monitoring the traffic channel (having read the traffic channel assignment message transmitted by the base station over a monitored control channel). Thus, in addition to processing the received signals at processing center 720 for location information at block 723, the processing center according to this exemplary embodiment also includes processing circuitry 725, e.g., demodulation/decoding circuitry, to obtain speech information therefrom. This demodulation/decoding circuitry 725 can, for example, be the same as that used in the base station described above and, accordingly, is not further described herein.

Moreover, since the processing center 720 receives multiple copies of the received emergency call, e.g., one each from adjunct receivers 712, 714 and 716, the processing center can use macrodiversity techniques to obtain an optimized speech signal for forwarding to the emergency service center 730. That is, the processing center can demodulate and decode the multiple copies in a combined fashion to achieve better reliability. This can be done, for example, by switching between the strongest received signal to provide a form of selection diversity or by combining the multiple copies using well known techniques such as maximal ration or equal gain combining. Examples of macrodiversity per se can be found in U.S. Pat. No. 5,088,108 to Uddenfeldt et al., the disclosure of which is incorporated here by reference.

It is, of course, possible to embody the invention in specific forms other than those described above without departing from the spirit of the invention. Thus, the embodiments described above are merely illustrative and should not be considered restrictive in any way. The scope of the invention is determined by the following claims, rather than the preceding description, and all variations and equivalents which fall within the scope of the claims are intended to be embraced therein.

What is claimed is:

1. A method for monitoring system accesses to a radiocommunication system using an adjunct receiver comprising the steps of:

listening, by said adjunct receiver, to channel frequencies associated with said system;

evaluating, for channel frequencies on which transmissions are received by said adjunct receiver, whether said channel is a control channel or a traffic channel;

sending, to a central processing center, an identification of control channels which said adjunct receiver is able to monitor;

receiving, from said central processing center, an indication of which of said identified control channels said adjunct receiver is to monitor; and monitoring those control channels indicated by said central processing center.

2. The method of claim 1, wherein said channel frequencies are downlink channel frequencies.

3. The method of claim 1, wherein said channel frequencies are uplink channel frequencies.

4. The method of claim 1, wherein said step of monitoring further comprises the step of:

monitoring said control channels for emergency access by a remote station.

5. The method of claim 1, wherein the step of monitoring further comprises the steps of:

synchronizing to a downlink control channel to reduce time arrival uncertainty of uplink bursts;

decoding detectable uplink bursts;

grouping the decoded bursts into subchannels;

collecting bursts from subchannels by user identification; and analyzing information in bursts associated with each user identification.

6. The method of claim 1, further comprising the steps of:

receiving, at each of a plurality of adjunct receivers, an emergency call transmitted by a remote unit;

sending, by each of said plurality of adjunct receivers, a copy of said emergency call received thereby to the central processing center;

processing said plural copies of said emergency call in combination to obtain a speech signal associated therewith; and forwarding said speech signal to an emergency service center.

7. A method for monitoring system accesses to a radiocommunication system using a plurality of adjunct receivers comprising the steps of:

monitoring, by said plurality of adjunct receivers, a group of control channels used by said radiocommunication system; and broadcasting, over a communication infrastructure linking said plurality of adjunct receivers, information received on said group of control channels.

8. A method for scanning radiocommunication signals comprising the steps of:

synchronizing to a downlink control channel to reduce time arrival uncertainty of uplink bursts;

decoding detectable uplink bursts;

grouping the decoded bursts into subchannels;

collecting bursts from subchannels by user identification; and analyzing information in bursts associated with each user identification.

9. The method of claim 8, wherein said step of analyzing further comprises the step of:

determining if an access associated with said bursts is an emergency access.

10. A method for handling emergency calls in a radiocommunication system comprising the steps of:

receiving, at each of a plurality of adjunct receivers, an emergency call transmitted by a remote unit;

sending, by each of said plurality of adjunct receivers, a copy of said emergency call received thereby to a central processing center;

processing said plural copies of said emergency call in combination to obtain a speech signal associated therewith; and forwarding said speech signal to an emergency service center.

11. The method of claim 8, wherein said step of processing further comprises the steps of:

selecting a strongest received copy for use in obtaining said speech signal.

12. The method of claim 10, wherein said step of processing further comprises the steps of:

combining said plural copies using one of maximal ratio combining and equal gain combining to obtain said speech signal.

13. A method for monitoring system accesses to a radiocommunication system comprising the steps of:

listening to channel frequencies associated with the radiocommunication system;

evaluating the channel frequencies to determine whether each of the channel frequencies is a control channel or a traffic channel;

reporting an identification of channel frequencies which are determined to be control channels;

receiving an indication of which of the identified control channels are to be monitored; and monitoring the indicated control channels.

14. The method of claim 13, wherein the channel frequencies are downlink channel frequencies.

15. The method of claim 13, wherein the channel frequencies are uplink channel frequencies.

16. The method of claim 13, wherein the step of monitoring further comprises the step of:

monitoring the control channels for emergency access by a remote station.

17. The method of claim 16, wherein the step of monitoring the control channels for emergency access by a remote station further comprises the step of:

identifying an emergency access based upon a number dialed by the remote unit.

18. The method of claim 16, wherein the step of monitoring the control channels for emergency access by a remote station further comprises the step of:

identifying an emergency access based upon an indicator in the control channels.

19. The method of claim 13, wherein the steps of listening, evaluating, reporting, receiving and monitoring are performed by an adjunct receiver.

20. The method of claim 13, where in a processing center receives the identification of the channel frequencies which are determined to be control channels and sends an indication of which of the identified control channels are to be monitored.

21. A method for monitoring system accesses to a radio communication system comprising the steps of:

monitoring, at a plurality of locations, a group of control channels used by the radiocommunication system; and broadcasting information received on the group of control channels.

22. A method for handling emergency calls in a radiocommunication system comprising the steps of:

receiving, at a plurality of locations, an emergency call transmitted by a remote unit;

sending, from each of the plurality of locations, a copy of the emergency call received thereby to a processing center;

processing the plural copies of the emergency call in combination to obtain a speech signal associated therewith; and forwarding the speech signal to an emergency service center.

23. The method of claim 22, wherein the step of processing further comprises the step of:

selecting a strongest received copy for use in obtaining said speech signal.

24. The method of claim 22, wherein the step of processing further comprises the step of:

combining the plural copies using one of maximal ratio combining and equal gain combining to obtain said speech signal.

* * * * *